US008910234B2

(12) United States Patent
Morgan et al.

(10) Patent No.: US 8,910,234 B2
(45) Date of Patent: Dec. 9, 2014

(54) SYSTEM AND METHOD FOR ENFORCING NETWORK DEVICE PROVISIONING POLICY

(75) Inventors: Jane Morgan, Dublin (IE); Edward Ives, Exeter, RI (US); Peter Kokolski, Wrentham, MA (US)

(73) Assignee: Schneider Electric It Corporation, West Kingston, RI (US)

(*) Notice: Subject to any disclaimer, the term of this patent is extended or adjusted under 35 U.S.C. 154(b) by 853 days.

(21) Appl. No.: 11/842,351

(22) Filed: Aug. 21, 2007

(65) Prior Publication Data

US 2009/0055897 A1 Feb. 26, 2009

(51) Int. Cl.
*H04L 29/06* (2006.01)
*H04L 12/24* (2006.01)
*G06F 9/50* (2006.01)
*G06F 21/62* (2013.01)

(52) U.S. Cl.
CPC ........ *H04L 41/0893* (2013.01); *H04L 41/0806* (2013.01); *G06F 9/5027* (2013.01); *H04L 63/102* (2013.01); *G06F 21/6218* (2013.01); *G06F 9/5072* (2013.01)
USPC .................................................. 726/1; 726/4

(58) Field of Classification Search
CPC . G06F 9/5027; G06F 9/5072; G06F 21/6218; H04L 63/102; H04L 41/0806; H04L 41/0893
USPC .................................................... 726/4, 1, 3
See application file for complete search history.

(56) References Cited

U.S. PATENT DOCUMENTS

| | | | | |
|---|---|---|---|---|
| 5,764,155 | A | * | 6/1998 | Kertesz et al. ................. 700/295 |
| 5,768,148 | A | * | 6/1998 | Murphy et al. ................ 700/286 |
| 5,862,391 | A | * | 1/1999 | Salas et al. .................... 713/300 |
| 6,816,903 | B1 | | 11/2004 | Rakoshitz et al. |
| 6,829,593 | B1 | | 12/2004 | Ritter et al. |
| 6,871,156 | B2 | * | 3/2005 | Wallace et al. ............... 702/127 |
| 6,871,232 | B2 | | 3/2005 | Curie et al. |
| 6,882,904 | B1 | * | 4/2005 | Petrie et al. ................... 700/295 |

(Continued)

FOREIGN PATENT DOCUMENTS

JP 2003-316522 A 11/2003
JP 2005-182279 A 7/2005

(Continued)

OTHER PUBLICATIONS

International Search Report and Written Opinion from International Application No. PCT/US2008/073165, dated Feb. 11, 2009.
First Examination report from corresponding European patent application 08782715.
iTracs Corporation, Product Literature, www.itracs.com, initially reviewed on or about Feb. 23, 2007.
InfraStruXure® Central 4.0 Quick Start, InfraStruXure Central Quick Start Guide, American Power Conversion Corporation, Feb. 15, 2007, pp. 1-18.

(Continued)

*Primary Examiner* — David Garcia Cervetti
(74) *Attorney, Agent, or Firm* — Lando & Anastasi, LLP

(57) ABSTRACT

Systems and methods are provided for enforcing a network device provisioning policy. In one embodiment, a method may employ a computer based system to restrict access to data center resources, receive provisioning requests for access to the data center resources, authorize the provisioning requests after compliance with the network provisioning policy and allow the network device to access authorized data center resources. In another embodiment, a system includes interfaces for provisioning policy, request and task status information. The information provided by these interfaces is then used to determine compliance with applicable network device provisioning policies and restrict or allow access to the data center resources according to the provisioning policy.

23 Claims, 6 Drawing Sheets

(56) References Cited

U.S. PATENT DOCUMENTS

| | | | |
|---|---|---|---|
| 7,062,642 B1 | 6/2006 | Langrind et al. | |
| 7,065,042 B1* | 6/2006 | Pan et al. | 370/229 |
| 7,065,616 B2 | 6/2006 | Gajjar et al. | |
| 7,134,011 B2* | 11/2006 | Fung | 713/100 |
| 7,248,978 B2* | 7/2007 | Ransom | 702/62 |
| 7,277,861 B1* | 10/2007 | Benson et al. | 705/4 |
| 7,293,154 B1* | 11/2007 | Karr et al. | 711/202 |
| 7,307,837 B2* | 12/2007 | Merkin et al. | 361/679.33 |
| 7,337,283 B2* | 2/2008 | Susaki et al. | 711/154 |
| 7,337,950 B2* | 3/2008 | DeVault | 235/376 |
| 7,340,325 B2* | 3/2008 | Sousa et al. | 700/295 |
| 7,386,744 B2* | 6/2008 | Barr et al. | 713/320 |
| 7,430,568 B1* | 9/2008 | DeKoning et al. | 1/1 |
| 7,558,976 B2* | 7/2009 | Fung | 713/320 |
| 7,562,239 B2* | 7/2009 | Fung | 713/320 |
| 7,573,715 B2* | 8/2009 | Mojaver et al. | 361/716 |
| 7,721,096 B2* | 5/2010 | Chiasson et al. | 713/168 |
| 7,823,000 B2* | 10/2010 | Yap | 713/340 |
| 7,849,335 B2* | 12/2010 | Terry et al. | 713/300 |
| 7,978,845 B2* | 7/2011 | Caveney et al. | 379/413 |
| 8,209,248 B2* | 6/2012 | Dubinsky | 705/35 |
| 8,607,322 B2* | 12/2013 | Hinton et al. | 726/10 |
| 8,676,931 B1* | 3/2014 | Johnson et al. | 709/219 |
| 8,744,891 B1* | 6/2014 | Medina, III | 705/7.26 |
| 2001/0042088 A1* | 11/2001 | Hotchkiss et al. | 707/530 |
| 2001/0056533 A1* | 12/2001 | Yianilos et al. | 713/153 |
| 2002/0004912 A1* | 1/2002 | Fung | 713/300 |
| 2002/0004913 A1* | 1/2002 | Fung | 713/300 |
| 2002/0004915 A1* | 1/2002 | Fung | 713/320 |
| 2002/0007463 A1* | 1/2002 | Fung | 713/320 |
| 2002/0007464 A1* | 1/2002 | Fung | 713/300 |
| 2002/0059427 A1 | 5/2002 | Tamaki et al. | 709/226 |
| 2002/0062454 A1* | 5/2002 | Fung | 713/300 |
| 2002/0064149 A1* | 5/2002 | Elliott et al. | 370/352 |
| 2002/0076052 A1* | 6/2002 | Yung et al. | 380/277 |
| 2002/0174066 A1* | 11/2002 | Kleckner et al. | 705/39 |
| 2002/0194324 A1* | 12/2002 | Guha | 709/223 |
| 2003/0061393 A1* | 3/2003 | Steegmans et al. | 709/250 |
| 2003/0069972 A1* | 4/2003 | Yoshimura et al. | 709/226 |
| 2003/0115118 A1* | 6/2003 | Reinemann | 705/30 |
| 2003/0188208 A1* | 10/2003 | Fung | 713/320 |
| 2003/0196126 A1* | 10/2003 | Fung | 713/300 |
| 2003/0200295 A1 | 10/2003 | Roberts et al. | |
| 2003/0200473 A1* | 10/2003 | Fung | 713/320 |
| 2004/0039847 A1 | 2/2004 | Persson et al. | |
| 2004/0103327 A1* | 5/2004 | Dake et al. | 713/300 |
| 2004/0107025 A1* | 6/2004 | Ransom et al. | 700/286 |
| 2004/0138787 A1* | 7/2004 | Ransom et al. | 700/295 |
| 2004/0186905 A1 | 9/2004 | Young et al. | |
| 2004/0220736 A1* | 11/2004 | Wallace et al. | 702/1 |
| 2004/0250059 A1 | 12/2004 | Ramelson et al. | |
| 2005/0041360 A1* | 2/2005 | Dettweiler | 361/160 |
| 2005/0043979 A1* | 2/2005 | Soares et al. | 705/7 |
| 2005/0060662 A1* | 3/2005 | Soares et al. | 715/810 |
| 2005/0091346 A1 | 4/2005 | Krishnaswami et al. | |
| 2005/0108582 A1* | 5/2005 | Fung | 713/300 |
| 2005/0125700 A1* | 6/2005 | Chang et al. | 713/300 |
| 2005/0177755 A1* | 8/2005 | Fung | 713/300 |
| 2005/0185654 A1 | 8/2005 | Zadikian et al. | |
| 2005/0198247 A1 | 9/2005 | Perry et al. | |
| 2005/0203761 A1* | 9/2005 | Barr et al. | 705/1 |
| 2005/0228886 A1 | 10/2005 | Cain et al. | |
| 2005/0235137 A1* | 10/2005 | Barr et al. | 713/1 |
| 2005/0283822 A1* | 12/2005 | Appleby et al. | 726/1 |
| 2006/0005032 A1* | 1/2006 | Cain et al. | 713/182 |
| 2006/0047800 A1* | 3/2006 | Caveney et al. | 709/223 |
| 2006/0059539 A1 | 3/2006 | Shashikumar et al. | |
| 2006/0075198 A1* | 4/2006 | Susaki et al. | 711/152 |
| 2006/0136437 A1* | 6/2006 | Yamasaki | 707/100 |
| 2006/0184935 A1* | 8/2006 | Abels et al. | 718/1 |
| 2006/0184936 A1* | 8/2006 | Abels et al. | 718/1 |
| 2006/0184937 A1* | 8/2006 | Abels et al. | 718/1 |
| 2006/0190734 A1* | 8/2006 | Spitz | 713/176 |
| 2006/0209877 A1 | 9/2006 | Yamamoto et al. | |
| 2006/0236061 A1 | 10/2006 | Koclanes | |
| 2006/0248324 A1* | 11/2006 | Fung | 713/1 |
| 2006/0248325 A1* | 11/2006 | Fung | 713/1 |
| 2006/0248358 A1* | 11/2006 | Fung | 713/300 |
| 2006/0248359 A1* | 11/2006 | Fung | 713/300 |
| 2006/0248360 A1* | 11/2006 | Fung | 713/300 |
| 2006/0248577 A1 | 11/2006 | Beghian et al. | |
| 2006/0253717 A1* | 11/2006 | Fung | 713/300 |
| 2006/0259796 A1* | 11/2006 | Fung | 713/300 |
| 2006/0259797 A1* | 11/2006 | Fung | 713/300 |
| 2006/0265608 A1* | 11/2006 | Fung | 713/300 |
| 2006/0265609 A1* | 11/2006 | Fung | 713/300 |
| 2006/0282876 A1* | 12/2006 | Shelest et al. | 726/1 |
| 2006/0287763 A1* | 12/2006 | Ochi et al. | 700/231 |
| 2007/0005995 A1 | 1/2007 | Kardach et al. | 713/300 |
| 2007/0022425 A1 | 1/2007 | Jackson | |
| 2007/0022469 A1 | 1/2007 | Cooper et al. | |
| 2007/0025039 A1* | 2/2007 | Sousa et al. | 361/90 |
| 2007/0030613 A1* | 2/2007 | Sousa et al. | 361/92 |
| 2007/0067395 A1* | 3/2007 | Blinn et al. | 709/206 |
| 2007/0097659 A1* | 5/2007 | Behrens et al. | 361/788 |
| 2007/0101173 A1* | 5/2007 | Fung | 713/300 |
| 2007/0117444 A1* | 5/2007 | Caveney et al. | 439/404 |
| 2007/0118771 A1* | 5/2007 | Bolan et al. | 713/300 |
| 2007/0124606 A1* | 5/2007 | Hsieh | 713/300 |
| 2007/0132503 A1* | 6/2007 | Nordin | 327/518 |
| 2007/0162582 A1* | 7/2007 | Belali et al. | 709/223 |
| 2007/0207666 A1* | 9/2007 | Caveney et al. | 439/540.1 |
| 2007/0213000 A1* | 9/2007 | Day | 454/184 |
| 2007/0239870 A1* | 10/2007 | Kennedy et al. | 709/224 |
| 2007/0240006 A1* | 10/2007 | Fung | 713/323 |
| 2007/0245165 A1* | 10/2007 | Fung | 713/320 |
| 2007/0278020 A1* | 12/2007 | Harris et al. | 178/18.01 |
| 2007/0282951 A1* | 12/2007 | Selimis et al. | 709/205 |
| 2008/0007909 A1* | 1/2008 | Merkin et al. | 361/685 |
| 2008/0030945 A1* | 2/2008 | Mojaver et al. | 361/685 |
| 2008/0114999 A1* | 5/2008 | Terry et al. | 713/340 |
| 2008/0126616 A1* | 5/2008 | Kumasawa et al. | 710/42 |
| 2008/0155551 A1* | 6/2008 | Yoshida et al. | 718/104 |
| 2008/0183712 A1* | 7/2008 | Westerinen et al. | 707/9 |
| 2008/0214140 A1* | 9/2008 | Caveney et al. | 455/402 |
| 2008/0244291 A1* | 10/2008 | Alexander et al. | 713/323 |
| 2009/0006739 A1* | 1/2009 | Lubbers et al. | 711/114 |
| 2009/0006741 A1* | 1/2009 | Lubbers et al. | 711/114 |
| 2009/0006877 A1* | 1/2009 | Lubbers et al. | 713/323 |
| 2009/0031157 A1* | 1/2009 | Yap | 713/340 |
| 2009/0076749 A1* | 3/2009 | Nasle | 702/62 |
| 2009/0106571 A1* | 4/2009 | Low et al. | 713/310 |
| 2009/0173473 A1* | 7/2009 | Day | 165/67 |
| 2009/0265568 A1* | 10/2009 | Jackson | 713/320 |
| 2010/0223418 A1* | 9/2010 | Kumasawa et al. | 710/316 |

FOREIGN PATENT DOCUMENTS

| | | |
|---|---|---|
| JP | 2006-178976 A | 7/2006 |
| JP | 2006-180095 A | 7/2006 |
| JP | 2006-190254 A | 7/2006 |
| JP | 2006-518080 A | 8/2006 |
| JP | 2006-522420 A | 9/2006 |
| JP | 2006-285410 A | 10/2006 |
| JP | 2007-156587 A | 6/2007 |
| JP | 2007-179271 A | 7/2007 |
| RU | 2169437 C1 | 6/2001 |
| WO | 2006108778 A2 | 10/2006 |

OTHER PUBLICATIONS

InfraStruXure® Manager v4.6.1 Release Notes, American Power Conversion Corporation, dated Nov. 22, 2006, pp. 1-3.
NCPI Data Center Management, American Power Conversion Corporation, 2006, slides 1-34.
InfraStruXure® Manager v4.6.0 Update, American Power Conversion Corporation, Oct. 26, 2006, pp. 1-11.
InfraStruXure® Manager v.4x Building Management System Integration, Jon Runk, 2006, pp. 1-38.
User's Guide InfraStruXure® Manager, American Power Conversion Corporation, Aug. 2006, 1-245.

* cited by examiner

SYSTEM AND METHOD FOR ENFORCING NETWORK DEVICE PROVISIONING POLICY

BACKGROUND OF INVENTION

1. Field of Invention

At least one embodiment of the present invention relates generally to methods and systems for managing data center resources, and more specifically, to a method and system for enforcing network device provisioning policy.

2. Discussion of Related Art

In response to the increasing demands of information-based economies, information technology networks continue to proliferate across the globe. One manifestation of this growth is the centralized network data center. A centralized network data center typically includes various information technology equipment, collocated in a structure that provides telecommunication connectivity, electrical power and cooling capacity. Often the equipment is housed in specialized enclosures termed "racks" which integrate these connectivity, power and cooling resources. These characteristics make data centers a cost effective way to deliver the computing power required by modern applications.

Proper provisioning of data center equipment is important to efficient utilization of data center resources. Several software companies market applications that assist data center personnel in manually maintaining efficient data center floor and rack space documentation. The features included in these software applications enable tracking of the space, cooling and power resource capacity of the data center given various physical layouts and equipment types.

Some software packages include support for workflow functionality designed to coordinate the maintenance of particular data center floor and rack plans. The maintenance or "change management" functionality of these packages enable data center personnel to ensure each group involved in the provisioning of a new piece of data center equipment has knowledge of the newly provisioned equipment and has performed its part of the provisioning process. This change management functionality helps data center personnel document both used and unused data center resources.

SUMMARY OF INVENTION

Aspects of the present invention relate generally to management of data center entities and their associated resources. Embodiments of the invention provide systems and methods for enforcing network device provisioning policies. At least one embodiment provides a system and method that enables a data center administrator to ensure that only equipment that has been properly authorized may receive the data center resources it requires to be operational.

One aspect of the invention is directed toward a computer-implemented method for managing data center resources that includes receiving a request to provide a data center resource to at least one network device, receiving an indication that the at least one network device is authorized to receive the data center resource from at least one provider, and issuing an instruction to the at least one provider of the data center resource instructing the provider to provide the data center resource to the at least one network device.

In the method, the act of receiving a request may include an act of receiving a requested time of activation of the at least one network device and the act of receiving an indication that the at least one network device is authorized may include receiving an indication that the time of activation has passed. In the method, the act of receiving an indication that the at least one network device is authorized may include an act of receiving an indication of installation of the at least one network device. In the method, the act of receiving an indication that the at least one network device is authorized may include an act of receiving an identifier of the network device scanned from either a bar code associated with the at least one network device or a radio frequency identification tag associated with the at least one network device. In the method, the act of receiving an indication that the at least one network device is authorized may include an act of receiving an indication of compliance with a policy defining a procedure for authorizing access to the data center resource by the at least one network device. In the method, the act of receiving a request to provide a data center resource may include an act of receiving a request to provide data center physical space. In the method, the act of receiving a request to provide a data center resource may include an act of receiving a request to provide a patch panel connection. In the method, the act of receiving a request to provide a data center resource may include an act of receiving a request to provide virtualized resources. In the method, the act of receiving a request to provide a data center resource may include an act of receiving a request to provide domain name system services. In the method, the act of receiving a request to provide a data center resource may include an act of receiving a request to provide dynamic host configuration protocol services. In the method, the act of receiving a request to provide a data center resource may include an act of receiving a request to provide console port server services. In the method, the act of receiving a request to provide a data center resource may include an act of receiving a request to provide network access security services. In the method, the act of receiving a request to provide a data center resource may include an act of receiving a request to provide software provisioning services. In the method, the act of receiving a request to provide a data center resource may include an act of receiving a request to provide power.

The method may also include an act of providing the data center resource to the at least one network device in response to the instruction. In the method, the act of providing the data center resource may include an act of providing power to the at least one network device in response to the instruction.

Another aspect of the invention is directed toward a computer-readable medium having computer-readable signals stored thereon that define instructions that, as a result of being executed by a computer, instruct the computer to receive a request to provide a data center resource to at least one network device, receive an indication that the at least one network device is authorized to receive the data center resource from at least one provider, and issue an instruction to the at least one provider of the data center resource instructing the provider to provide the data center resource to the at least one network device.

Another aspect of the invention is directed toward a system for managing data center resources that includes an input configured to receive a request to provide a data center resource to at least one network device and to receive an indication that the at least one network device is authorized to receive the data center resource from at least one provider of the data center resource, a controller coupled to the input and configured to generate instructions for the at least one provider, the instructions requesting that the at least one provider either withhold the data center resource from the at least one network device or provide the data center resource to the at least one network device and an output coupled to the controller and configured to provide the instructions to the at least one provider of the data center resource.

In the system, the data center resource may include power. In the system, the input may be further configured to receive a policy defining a procedure for authorizing the at least one network device to receive the data center resource from the at least one provider. In the system, the controller may be further configured to allow identified users to authorize the request without complying with the policy.

The system may also include an interface configured to provide and receive status information pertaining to tasks required by the policy. In the system, the interface may be further configured to prompt for the status information according to a workflow.

BRIEF DESCRIPTION OF DRAWINGS

The accompanying drawings, are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
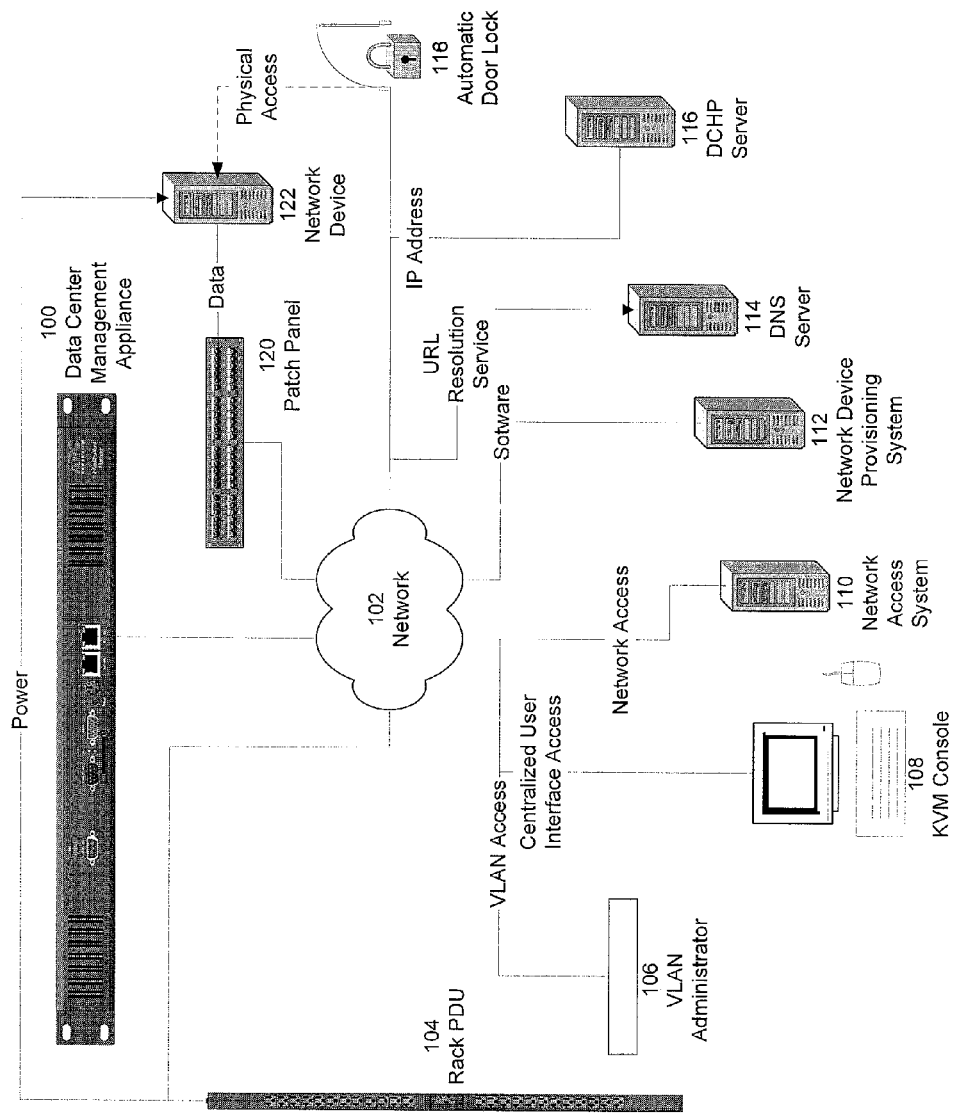
FIG. 1 shows a data center in which a system for enforcing network device provisioning policy in accordance with one embodiment of the invention is present.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," "having," "containing," "involving," and variations thereof herein, is meant to be open-ended, i.e. including but not limited to.

At least one aspect of the present invention relates to systems and methods for enforcing network device provisioning policy. A network device provisioning policy may include a set of procedures defining specific tasks that should be conducted when adding or reconfiguring a network device to a network. The network device may include, for example, any apparatus that is capable of communicating via the network. Examples of network devices include servers, desktop computers, laptop computers, routers, power distribution units (PDUs), automatic transfer switches (ATSs), network capable printers, switches, Voice over Internet Protocol Private Branch eXchanges (VoIP PBXs), server appliances and IP telephones.

The system or method for enforcing network device provisioning policy may be implemented with respect to a network data center, typically using an automated data center manager, such as the well-known InfraStruXure® Central Server available commercially from the American Power Conversion Corporation, of West Kingston, R.I. In at least one embodiment, the provisioning policy may be enforced by restricting network device access to one or more data center resources, preventing a data center resource provider from providing data center resources to a network device and/or not instructing a data center resource provider to provide data center resources to a network device until full compliance with the provisioning policy has been achieved.

A data center resource may include, for example, any characteristic of a data center that enables network device functionality. Examples of data center resources include power, cooling, physical space, remote equipment control capability, virtualized resources, distributed computing resources, shared data storage, software provisioning, network time synchronization, physical and logical security and physical and logical network connectivity and data transmission. These data center resources may be provided by various data center equipment. This equipment may include network devices.

More particularly, examples of data center resource providers may include power generation and distribution equipment, cooling generation and distribution equipment, floor space, racks, logical network connectivity software and data transmission equipment, physical network connectivity equipment, physical access control equipment, data storage equipment, distributed application services equipment, network time synchronization equipment and remote device control equipment.

A non-limiting list of various exemplary data center resource providers follows. Other providers may be employed in relation to the present invention without departing from the spirit thereof. Exemplary power generation and distribution equipment may include transformers, automatic transfer switches (ATSs), uninterruptible power supplies (UPSs), generators, three-phase power distribution units, single-phase power distribution units, rack mounted power distribution units and individual outlets in power distribution units. Examples of coolant generation and distribution providers may include computer room air conditioners, fluid distribution systems, refrigerant distribution systems, rack air conditioners and rack fans. Exemplary logical network connectivity software and data transmission equipment may include Domain Name System servers, Microsoft Active Directory servers, Virtual Local Area Networks, Remote Authentication Dial In User Service servers, Terminal Access Controller Access-Control System Plus servers, Lightweight Directory Access Protocol directories, Remote Authentication Dial In User Service servers, network access control systems, firewalls, Ethernet switches Dynamic Host Configuration Protocol Services servers, File Transfer Protocol servers, Remote Direct Memory Access over Internet Protocol connections, load balancers and InfiniBand switches. Examples of physical network connectivity equipment may include network cabling, patch panels, and physical matrix switches. Exemplary physical space access control equipment may include security cameras, room door locks, rack door locks, card readers, radio frequency identification readers. Examples of shared data storage equipment include Network File System servers, Network Attached Storage servers and storage area network servers. Exemplary distributed application services include Web Services servers. Exemplary network time synchronization equipment may include Network Time Protocol servers. Examples of remote equipment control equipment may include console port servers and Keyboard Video Mouse (KVM) switches.

In one embodiment, once tasks specified by the provisioning policy have been completed, access to the restricted data center resources may be granted. For instance, the network device provisioning policy may specify that a business manager, a product development manager and a data center manager all sign off any new server installations for which their organizational units are responsible. Once all of these organizational signoffs have occurred, the data center manager may enable a power feed to the proper data center location to support the new server.

Embodiments of the present invention may restrict access to data center resources by implementing centralized control of network devices that provide data center resources to other network devices. This centralized control may be administered through the network. FIG. 1 illustrates one embodiment in accordance with the present invention when implemented in a centralized data center environment. Data center management appliance 100 is connected to network 102. Network 102 is connected to rack PDU 104, Virtual Local Area Network (VLAN) administrator 106, Keyboard Video Mouse (KVM) console 108, network access system 110, network device provisioning system 112, Domain Name System (DNS) server 114, Dynamic Host Configuration Protocol (DHCP) server 116, automatic door lock 118, patch panel 120 and network device 122 through patch panel 120. As discussed further below, data center management appliance 100 may control these devices by issuing commands through network 102.

FIG. 1 includes many exemplary providers of data center resources for network device 122. Rack PDU 104 supplies power to network device 122. VLAN Administrator 106 enables access to one or more virtual local area networks to network device 122. KVM console 108 supports a remote and centralized user interface to network device 122. Network Access System 110 provides logical network access to network device 122. Network device provisioning system 112 provides software to fully enable network device 122. DNS Server 114 provides resolution of domain names to IP addresses for network device 122. DHCP server 116 may provide at least one IP address to network device 122. Automatic door lock 118 allows entry to the physical space in which network device 122 resides, which in a data center may include rack space. Finally, patch panel 120 provides physical network connectivity to network device 122. This list of data center resource providers is not exhaustive and others may be controlled without departing from the spirit of the present invention.

In one embodiment, an instance of the network device provisioning policy enforcer 300, as discussed with reference to FIG. 3 below, may be active on data center management appliance 100. Data center management appliance 100 may be any device capable of executing centralized data center management software including, for example, an InfraStruXure® Central Server. Embodiments of the present invention may use systems, devices and methods described in U.S. patent application Ser. No. 11/342,300, filed Jan. 27, 2006, titled "Methods and Systems for Managing Facility Power and Cooling," incorporated herein in its entirety by reference.

In accordance with an embodiment of the present invention, data center management appliance 100 may restrict access to network resources by issuing instructions through network 102 to the various data center resource providers 104-120. Subsequently, data center management appliance 100 may receive a request to allow access to data center resources for network device 122. This request may take the form of an automated workflow request, an automatic request upon power up of network device 122, a manually entered request, or any other form by which data can be received by data center management appliance 100. Data center management appliance 100 may determine if any applicable network device provisioning policies have been satisfied. If the network device provisioning policies applicable to network device 122 have been satisfied, data center management appliance 100 may allow access data center resources for network device 122 by issuing instructions, through network 102, to the data center resource providers 104-120.

Figure 2:
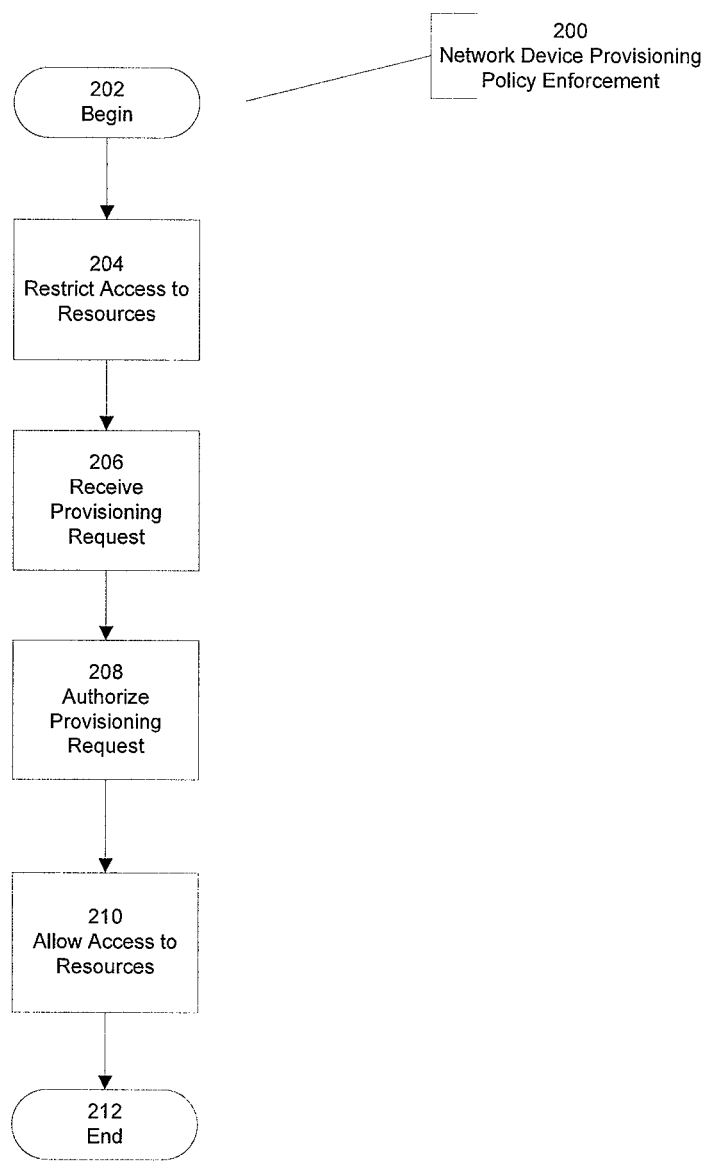
FIG. 2 is a flow chart of a process for enforcing network device provisioning policy according to one embodiment of the invention.

FIG. 2 shows an example process 200 for enforcing network device provisioning policy according to one embodiment of the present invention. This process may be implemented using a general-purpose computer system as discussed with regard to FIG. 4 below. At block 202, process 200 begins. At block 204, access to data center resources is restricted. In one embodiment, this restriction is carried out by instructing the data center resource providers to not service future requests by network devices until instructed to do so. These instructions may be manual or automatic and may be remotely or locally initiated. The protocol and content of these instructions may depend on the type of network resource provider receiving the instruction. Therefore, it should be appreciated that the identities and technical characteristics of the data center resource providers may be recorded prior to process 200 being conducted. The technical characteristics of a network resource provider may include the type of network resource it brokers and communication protocols it supports.

At block 206, a network device provisioning request is received. Typically, such a request may include the identity of the network device being provisioned, a provisioning time, the functional type of network device being provisioned and a set of data center resources that are requested to enable network device functionality. The provisioning time may refer to the point in time when access to any requested data center resources will be allowed. The functional type of a network device may be based on the function the device performs, e.g. server, printer, router, PDU, ATS, etc, and thus may determine which data center resources are requested. For instance, a network device provisioning request may specify a web server to be provisioned at 12:00 AM on Jan. 12, 2008 in rack 123. In this case, the provisioning time would be 12:00 AM on Jan. 12, 2008, the network device functional type may be a web server and requested data center resources may include power, physical and logical network connectivity, physical access to rack 123 and installation of any software normally provided to a web server.

At block 208, the network device provisioning request is authorized. This authorization may be partial or full, manual or automatic and should be effective after compliance with any applicable provisioning policies. A partial authorization pertains to a subset of the requested data center resources and may be granted when a subset of the requested data center resources are unavailable or not needed to enable the functionality of the network device. It should be appreciated that the any applicable provisioning policies may be authored prior to process 200 being conducted. It should also be appreciated that because authorization is dependent on compliance with applicable provisioning policy, the timing of authorization is flexible relative to the requested provisioning time. For instance, authorization could be granted several days before the requested provisioning time, or authorization could occur when the network device attempts to access a data center resource.

At block 210, the network device provisioning request is fulfilled. This fulfillment may be full or partial and may include allowing a requested network device to access and/or receive data center resources from the data center resource providers authorized in the request. A partial fulfillment pertains to a subset of the requested data center resource providers and may be completed when a request has been partially authorized. In one embodiment, access is allowed in response to the network device provisioning request by instructing the data center resource providers to allow access to and/or provide data center resources to the network device identified in the network device provisioning request. As with block 204 above, these instructions may be manual or automatic and may be remotely or locally initiated. The protocol and content of these instructions may depend on the type of network resource provider receiving the instruction.

At block 212, process 200 ends.

Process 200 depicts a preferable sequence of events. Other stages can be added, or the order of stages can be altered in the process 200 without departing from the spirit of the present invention.

Figure 3:
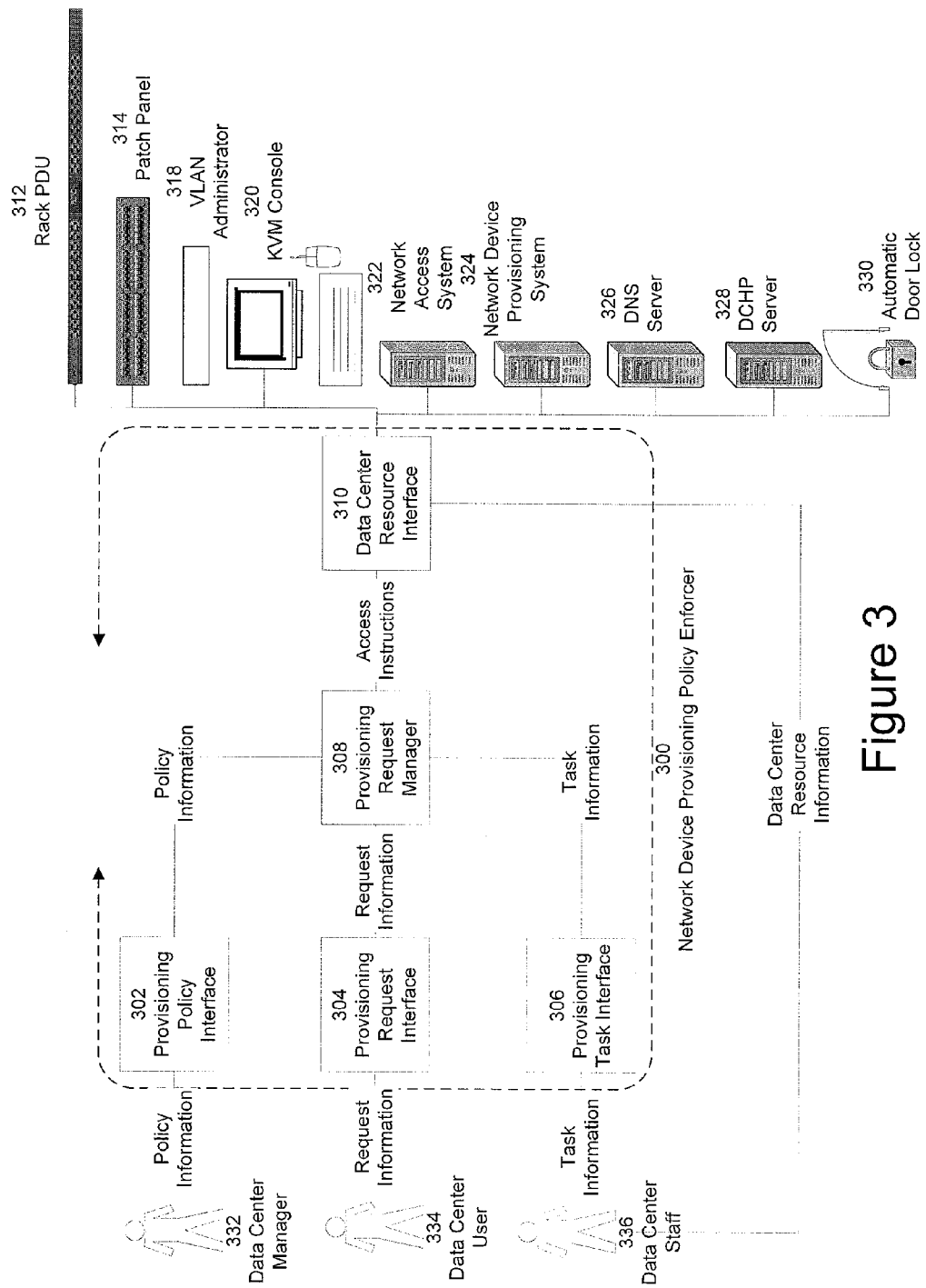
FIG. 3 depicts, in context, a system for system for enforcing network device provisioning policy in accordance with one embodiment of the invention.

FIG. 3 illustrates a system 300 for network device provisioning policy according to one embodiment of the invention. Any of the recited modules may be implemented in customized software code or using existing software including a GUI, email, FTP, batch system interface, database system data movement tools, middleware, scanning with optical character recognition (OCR), any combination thereof, or otherwise. Moreover, the modular structure and content recited below is for exemplary purposes only and is not intended to limit the invention to the specific structure shown in FIG. 3. As will be apparent to one of ordinary skill in the art, many variant modular structures can be architected without deviating from the present invention. The particular modular arrangement presented in FIG. 3 was chosen to promote clarity. In one embodiment, system 300 may be implemented as a component of an automated data center manager, such as an InfraStruXure® Central Server.

System 300 may include a provisioning policy interface 302, provisioning request interface 304, provisioning task interface 306, provisioning request manager 308 and data center resource interface 310. Module 302 accepts provisioning policy information from various sources and supplies that information to module 308. Module 304 accepts provisioning request information from various sources and supplies that information to module 308. Module 306 accepts provisioning task information from various sources and supplies that information to module 308. Module 308 accepts provisioning policy, request and task information and supplies access instructions to data center resource interface 310 and data resource and request status information to module 304. Access instructions may include commands to a data center resource provider to allow or restrict access to network devices. Module 310 accepts access instructions from module 308, supplies access instructions to data center resource providers 312-330 and supplies responses generated by data center resource providers 312-330 to module 308. Information may flow between these modules using any technique known in the art. Such techniques include passing the information over the network via TCP/IP, passing the information between modules in memory and passing the information by writing to a file, database, or some other non-volatile storage device.

Modules 302, 304, 306 and 310 exchange information with various sources and consumers. These sources and consumers may include system and user interfaces. In the exemplary embodiment illustrated in FIG. 3, data center manager 332 and data center user 334 each respectively exchange information with modules 302 and 304, while data center staff 336 exchange information with modules 306 and 310. In an alternative embodiment, this information may be exchanged with other applications or storage media using system interfaces exposed by modules 302, 304, 306 and 310. Each of these modules may both restrict input to a predefined information domain and validate any information entered prior to using the information or supplying the information to other modules.

Module 302 exposes interfaces that accept and supply network device provisioning policy information. In one embodiment, module 302 may configure policies to apply to various data center resource provider or network device characteristics. For example, module 302 may configure one set of policies to apply to blade servers, a second set of policies to apply to all network devices requested to occupy specifically identified racks within the data center, and a third set of policies to apply to all data center resource requests. Policy application targeted to other characteristics is possible without departing from the spirit of the present invention.

Module 304 exposes interfaces that accept and supply network device provisioning request information and provisioning request status information. In one embodiment, upon receiving a request, module 304 may confirm the availability of the requested data center resources by exchanging information with module 308. Module 304 may expose request status information, such as progress made on tasks specified by applicable provisioning policy, by exchanging request status information with module 308. Upon authorization and fulfillment of the request, module 304 may highlight the request and supply finalized status information.

Module 306 exposes interfaces that accept and supply network device provisioning task status information. As discussed above, network device provisioning policies may include a set of procedures defining specific tasks that should be completed prior to activating the network device being provisioned. In one embodiment, module 306 may enable the review and maintenance of status information for tasks applicable to unfulfilled requests by exchanging information with module 308. Module 306 may also include workflow functionality to help streamline the review and maintenance of status information by directing users to work on, and report the status of, specific tasks.

Module 310 exposes interfaces that accept and supply data center resource information. In one embodiment, data center staff 336 may configure information regarding data center resource providers 312-330 using module 310. In another embodiment module 310 may automatically discover data center resource providers 312-330. Module 310 may also translate access instructions accepted from module 308 into data center resource provider specific protocols and issue these commands to resource providers 312-330. Module 310 may return any responses to the access instructions to module 308. In one embodiment, module 310 may be architected as submodules, each capable of communicating with a specific functional type of data resource provider.

Module 308 uses policy, request and task information to determine when requested access to a data center resource provider has been authorized and issues access instructions to module 310 appropriately. In one embodiment, module 308 may validate availability of data center resources by issuing access instructions to module 310 and evaluating responses. Module 308 may include task management functionality that determines which policies apply to a request, associates policy-driven tasks with the request and maintains the status of each task associated with the request. Module 308 may determine that the request has been authorized when all of the tasks associated with the request have been accomplished and may issue access instructions for such authorized requests to module 310. Alternatively, module 308 may be configured to enable a group of specified users to grant authorization of a request without requiring adherence to any of the applicable provisioning policies. Finally, module 308 may record as fulfilled any authorized request for which access to authorized data center resource providers has been successfully granted.

The above defined process 200, according to one embodiment of the invention, may be implemented on one or more general-purpose computer systems. For example, various aspects of the invention may be implemented as specialized software executing in a general-purpose computer system 400 such as that shown in FIG. 4. Computer system 400 may include one or more output devices 401, one or more input devices 402, a processor 403 connected to one or more memory devices 404 through an interconnection mechanism 405 and one or more storage devices 406 connected to interconnection mechanism 405. Output devices 401 typically render information for external presentation and examples include a monitor and a printer. Input devices 402 typically accept information from external sources and examples include a keyboard and a mouse. Processor 403 typically performs a series of instructions resulting in data manipulation. Processor 403 is typically a commercially available processor such as an Intel Pentium, Motorola PowerPC, SGI MIPS, Sun UltraSPARC, or Hewlett-Packard PA-RISC processor, but may be any type of processor. Memory devices 404, such as a disk drive, memory, or other device for storing data is typically used for storing programs and data during operation of the computer system 400. Devices in computer system 400 may be coupled by at least one interconnection mechanism 405, which may include, for example, one or more communication elements (e.g., busses) that communicate data within system 400.

Figure 5:
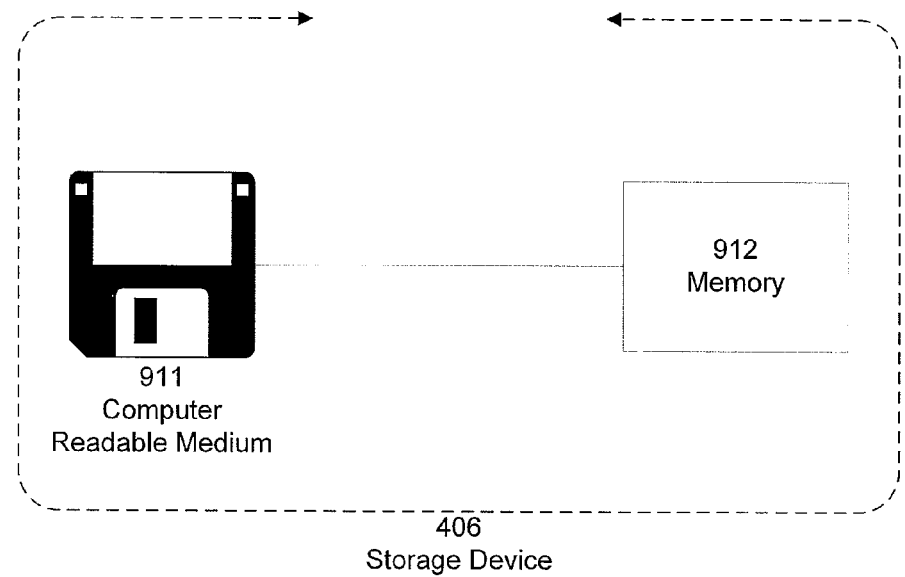
FIG. 5 illustrates a storage device of a general-purpose computer system.

The storage device 406, shown in greater detail in FIG. 5, typically includes a computer readable and writeable nonvolatile recording medium 911 in which signals are stored that define a program to be executed by the processor or information stored on or in the medium 911 to be processed by the program. The medium may, for example, be a disk or flash memory. Typically, in operation, the processor causes data to be read from the nonvolatile recording medium 911 into another memory 912 that allows for faster access to the information by the processor than does the medium 911. This memory 912 is typically a volatile, random access memory such as a dynamic random access memory (DRAM), static memory (SRAM). Memory 912 may be located in storage device 406, as shown, or in memory device 404. The processor 403 generally manipulates the data within the memory 404, 912 and then copies the data to the medium 911 after processing is completed. A variety of mechanisms are known for managing data movement between the medium 911 and the memory 404, 912, and the invention is not limited thereto. The invention is not limited to a particular memory device 404 or storage device 406.

Computer system 400 may be implemented using specially programmed, special purpose hardware, or may be a general-purpose computer system that is programmable using a high-level computer programming language. For example, computer system 400 may include cellular phones and personal digital assistants. Computer system 400 usually executes an operating system which may be, for example, the Windows 95, Windows 98, Windows NT, Windows 2000, Windows ME, Windows XP, Windows Vista or other operating systems available from the Microsoft Corporation, MAC OS System X available from Apple Computer, the Solaris Operating System available from Sun Microsystems, or UNIX operating systems available from various sources (e.g., Linux). Many other operating systems may be used, and the invention is not limited to any particular implementation. For example, an embodiment of the present invention may instruct data center resource providers to restrict access to network devices using a general-purpose computer system with a Sun UltraSPARC processor running the Solaris operating system.

Figure 4:
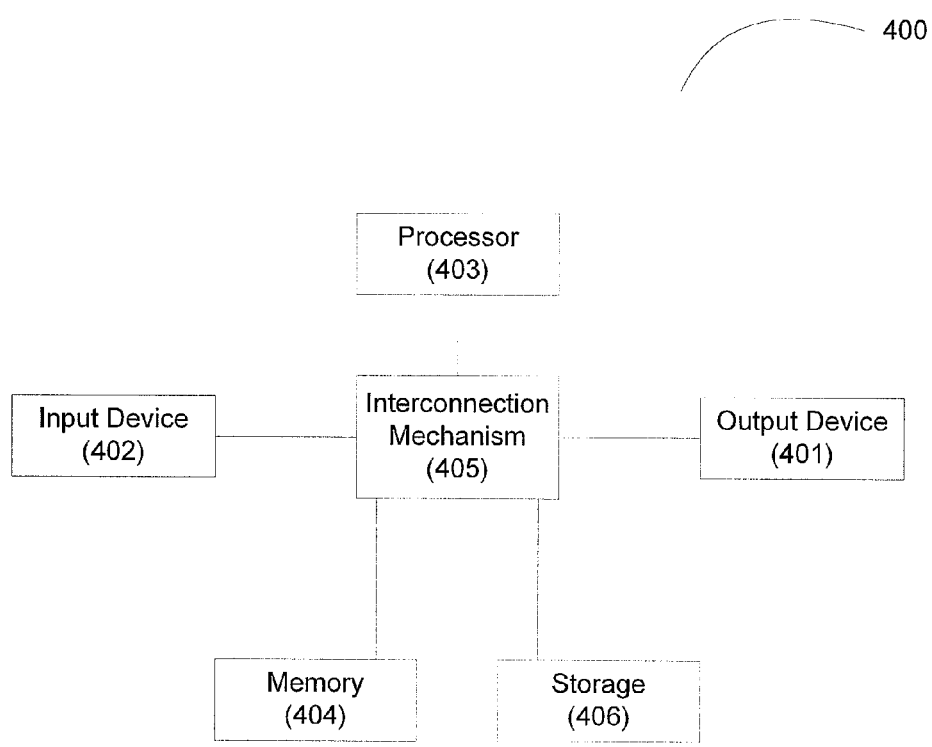
FIG. 4 shows a general-purpose computer system upon which various embodiments of the invention may be practiced.

Although computer system 400 is shown by way of example as one type of computer system upon which various aspects of the invention may be practiced, it should be appreciated that the invention is not limited to being implemented on the computer system as shown in FIG. 4. Various aspects of the invention may be practiced on one or more computers having a different architecture or components than that shown in FIG. 4. To illustrate, one embodiment of the present invention may receive network device provisioning requests using several general-purpose computer systems running MAC OS System X with Motorola PowerPC processors and several specialized computer systems running proprietary hardware and operating systems.

Figure 6:
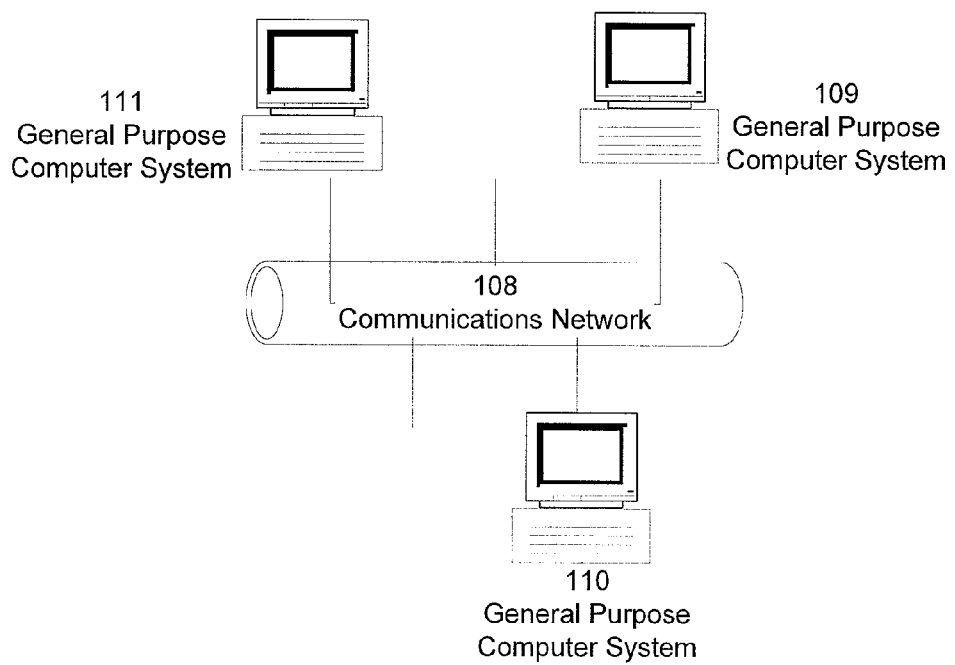
FIG. 6 depicts a network of general-purpose computer systems.

As depicted in FIG. 6, one or more portions of the system may be distributed to one or more computers (e.g., systems 109-111) coupled to communications network 108. The physical media used in communications network 108 may include any known in the art, such as, for example, physical cabling and/or wireless technology (e.g. RF, Infrared, etc . . . ). Moreover, each physical medium may comply with various standards such as, for example, CAT 5 cabling standard or IEEE 802.11, Bluetooth and Zigbee wireless standards. The computer systems 109-111 may also be general-purpose computer systems. For example, various aspects of the invention may be distributed among one or more computer systems configured to provide a service (e.g., servers) to one or more client computers, or to perform an overall task as part of a distributed system. More particularly, various aspects of the invention may be performed on a client-server system that includes components distributed among one or more server systems that perform various functions according to various embodiments of the invention. These components may be executable, intermediate (e.g., IL) or interpreted (e.g., Java) code which communicate over a communication network (e.g., the Internet) using a communication protocol (e.g., TCP/IP). To illustrate, one embodiment may display network device provisioning request status information though a browser interpreting HTML forms and may retrieve data center resource provider information using a data translation service running on a separate server.

Various embodiments of the present invention may be programmed using an object-oriented programming language, such as SmallTalk, Java, C++, Ada, or C# (C-Sharp). Other object-oriented programming languages may also be used. Alternatively, functional, scripting, and/or logical programming languages may be used. Various aspects of the invention may be implemented in a non-programmed environment (e.g., documents created in HTML, XML or other format that, when viewed in a window of a browser program, render aspects of a graphical-user interface (GUI) or perform other functions). Various aspects of the invention may be implemented as programmed or non-programmed elements, or any combination thereof. For example, a provisioning policy user interface may be implemented using a Microsoft Word document while the application designed to manage provisioning requests may be written in C++.

It should be appreciated that a general-purpose computer system in accord with the present invention may perform functions outside the scope of the invention. For instance, aspects of the system may be implemented using an existing commercial product, such as, for example, Database Management Systems such as SQL Server available from Microsoft of Seattle WA., Oracle Database from Oracle of Redwood Shores, Calif., and MySQL from MySQL AB of UPPSALA, Sweden and WebSphere middleware from IBM of Armonk, N.Y. If SQL Server is installed on a general-purpose computer system to implement an embodiment of the present invention, the same general-purpose computer system may be able to support databases for sundry applications.

Based on the foregoing disclosure, it should be apparent to one of ordinary skill in the art that the invention is not limited to a particular computer system platform, processor, operating system, network, or communication protocol. Also, it should be apparent that the present invention is not limited to a specific architecture or programming language.

Having now described some illustrative embodiments of the invention, it should be apparent to those skilled in the art that the foregoing is merely illustrative and not limiting, having been presented by way of example only. While the bulk of this disclosure is focused on data center embodiments, aspects of the present invention may be applied to other types of information technology networks, for instance LANs and WANs. Similarly, aspects of the present invention may be used to achieve other objectives including standardization of network device hardware and network device installation project management. Numerous modifications and other illustrative embodiments are within the scope of one of ordinary skill in the art and are contemplated as falling within the scope of the invention. In particular, although many of the examples presented herein involve specific combinations of method acts or system elements, it should be understood that those acts and those elements may be combined in other ways to accomplish the same objectives. Acts, elements and features discussed only in connection with one embodiment are not intended to be excluded from a similar role in other embodiments.

What is claimed is:

1. A computer-implemented method for managing data center resources to enforce network device provisioning policies within a data center, the method comprising acts of:
   issuing, by a computer system, an instruction to at least one provider of a data center resource instructing the at least, one provider to prevent provision of the data center resource to network devices in the data center;
   receiving a request to provide the data center resource to at least one network device, the request including information specifying the data center resource;
   determining at least one provisioning policy that applies to the request, the provisioning policy specifying a plurality of organizational signoffs to occur when reconfiguring the at least one network device or when adding the at least one network device to a network;
   determining that the at least one network device is authorized to receive the data center resource from the at least one provider at least in part by determining the plurality of organizational signoffs have occurred; and
   issuing an instruction to the at least one provider of the data center resource instructing the at least one provider to provide the data center resource to the at least one network device.

2. The method according to claim 1, wherein the act of receiving request includes an act of receiving a requested time of activation of the at least one network device and the act of determining that the at least one network device is authorized includes receiving an indication that the time of activation has passed.

3. The method according to claim 1, wherein the act of determining that the at least one network device is authorized includes an act of receiving an indication of installation of the at least one network device.

4. The method according to claim 1, wherein the act of determining that the at least one network device is authorized includes an act of receiving an identifier of the network device scanned from either a bar code associated with the at least one network device or a radio frequency identification tag associated with the at least one network device.

5. The method according to claim 1, wherein the act of determining that the at least one network device is authorized includes an act of receiving an indication of compliance with a policy defining a procedure for authorizing access to the data center resource by the at least one network device.

6. The method according to claim wherein the act of receiving a request to provide a data center resource includes an act of receiving a request to provide data center physical space.

7. The method according to claim 1, wherein the act of receiving a request to provide a data center resource includes an act of receiving a request to provide a patch panel connection.

8. The method according to claim I, wherein the act of receiving a request to provide a data center resource includes an act of receiving a request to provide virtualized resources.

9. The method according to claim 1, wherein the act of receiving a request to provide a data center resource includes an act of receiving a request to provide domain name system services.

10. The method according to claim I, wherein the act of receiving a request to provide a data center resource includes an act of receiving a request to provide dynamic host configuration protocol services.

11. The method according to claim 1, wherein the act of receiving a request to provide a data center resource includes an act of receiving a request to provide console port server services.

12. The method according to claim 1, wherein the act of receiving a request to provide a data center resource includes an act of receiving a request to provide network access security services.

13. The method according to claim 1, wherein the act of receiving a request to provide a data center resource includes an act of receiving a request to provide software provisioning services.

14. The method according to claim 1, wherein the act of receiving a request to provide a data center resource includes an act of receiving a request to provide electrical power.

15. The method according to claim 1, further comprising an act of providing the data center resource to the at least one network device in response to the instruction.

16. The method according to claim 15, wherein the act of providing the data center resource includes an act of providing electrical power to the at least one network device in response to the instruction.

17. A non-transitory computer-readable medium storing computer-readable instructions that, as a result of being executed by a computer, instruct the computer to perform a method of managing data center resources to enforce network device provisioning policies within a data center, the method comprising:
   issuing, by the computer system, an instruction to at least one provider of a data center resource instructing the at least one provider to prevent provision of the data center resource to network devices in the data center;
   receiving a request to provide the data center resource to at least one network device, the request including information specifying the data center resource;
   determining at least one provisioning policy that applies to the request, the provisioning policy specifying a plurality of organizational signoffs to occur when reconfiguring the at least one network device or when adding the at least one network device to a network;

determining that the at least one network device is authorized to receive the data center resource from the at least one provider at least in part by determining the plurality of organizational signoffs have occurred; and issuing an instruction to the at least one provider of the data center resource instructing the at least one provider to provide the data center resource to the at least one network device.

18. A computer system for managing data center resources to enforce network device provisioning policies within a data center, the system comprising:

a user interface configured to receive a request to provide a data center resource to at least one network device located in a data center, the request including information specifying the data center resource, to determine at least one provisioning policy that applies to the request, the provisioning policy specifying a plurality of organizational signoffs to occur when reconfiguring the at least one network device or when adding the at least one network device to a network, and to determine that the at least one network device is authorized to receive the data center resource from at least one provider of the data center resource at least in part by determining the plurality of organizational signoffs have occurred;

a controller coupled to the user interface and configured to generate instructions for the at least one provider, the instructions requesting that the at least one provider either withhold the data center resource from the at least one network device or provide the data center resource to the at least one network device; and a system interface coupled to the controller and configured to provide the instructions to the at least one provider of the data center resource, wherein the controller issues an instruction requesting that the at least one provider prevent provision of the data center resource to the at least one network device prior to issuing any instructions requesting that the at least one provider provide the data center resource to the at least one network device.

19. The system according to claim 18, wherein the data center resource includes electrical power.

20. The system according to claim 18, wherein the user interface is thriller configured to receive the provisioning policy.

21. The system according to claim 20, further comprising an interface configured to provide and receive status information. pertaining to tasks required by the provisioning policy.

22. The system according to claim 21, wherein the interface is further configured to prompt for the status information according to a workflow.

23. The system according to claim 20, wherein the controller is further configured to allow identified users to authorize the request without complying with the provisioning policy.

* * * * *

UNITED STATES PATENT AND TRADEMARK OFFICE
CERTIFICATE OF CORRECTION

PATENT NO. : 8,910,234 B2
APPLICATION NO. : 11/842351
DATED : December 9, 2014
INVENTOR(S) : Jane E. Morgan et al.

Page 1 of 1

It is certified that error appears in the above-identified patent and that said Letters Patent is hereby corrected as shown below:

In the Claims

Column 11, claim 2, line 59, delete "receiving request" and insert --receiving a request--;

Column 12, claim 6, line 12, delete "claim wherein" and insert --claim 1, wherein--;

Column 12, claim 8, line 19, delete "claim I" and insert --claim 1--;

Column 12, claim 10, line 26, delete "claim I" and insert --claim 1--;

Column 14, claim 20, line 16, delete "thriller" and insert --further--;

Column 14, claim 21, line 20, delete "information. pertaining" and insert --information pertaining--.

Signed and Sealed this
Seventeenth Day of March, 2015

Michelle K. Lee
*Director of the United States Patent and Trademark Office*